United States Patent
Matsuda et al.

(10) Patent No.: US 11,975,732 B2
(45) Date of Patent: May 7, 2024

(54) IN-VEHICLE NOTIFICATION DEVICE, NOTIFICATION PROGRAM, AND CALCULATION DEVICE

(71) Applicant: Panasonic Intellectual Property Management Co., Ltd., Osaka (JP)

(72) Inventors: Takashi Matsuda, Osaka (JP); Changhui Yang, Osaka (JP); Takashi Iida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 17/632,822

(22) PCT Filed: Sep. 8, 2020

(86) PCT No.: PCT/JP2020/033862
§ 371 (c)(1),
(2) Date: Feb. 4, 2022

(87) PCT Pub. No.: WO2021/059950
PCT Pub. Date: Apr. 1, 2021

(65) Prior Publication Data
US 2022/0274619 A1 Sep. 1, 2022

(30) Foreign Application Priority Data
Sep. 25, 2019 (JP) .................. 2019-174175

(51) Int. Cl.
*B60W 50/14* (2020.01)
*B60L 58/12* (2019.01)

(52) U.S. Cl.
CPC ............. *B60W 50/14* (2013.01); *B60L 58/12* (2019.02); *B60L 2260/52* (2013.01);
(Continued)

(58) Field of Classification Search
CPC ..................................... B60W 50/14
See application file for complete search history.

(56) References Cited

U.S. PATENT DOCUMENTS 5,916,298 A * 6/1999 Kroiss ............... G01D 7/02
701/123
5,939,861 A 8/1999 Joko et al.
(Continued)

FOREIGN PATENT DOCUMENTS

| JP | 4-186179 A | 7/1992 |
| JP | 10-004603 | 1/1998 |

(Continued)

OTHER PUBLICATIONS

The EPC Office Action dated Oct. 18, 2022 for the related European Patent Application No. 20868587.5.
(Continued)

*Primary Examiner* — Travis R Hunnings
(74) *Attorney, Agent, or Firm* — Rimon P.C.

(57) ABSTRACT

An acquisition unit of in-vehicle notification device mounted on electric vehicle acquires a discharge current value discharged from secondary battery in electric vehicle to motor for running in electric vehicle. According to the acquired discharge current value, a notification unit notifies the driver of information indicating an impact of a current driving condition by the driver of electric vehicle on degradation of secondary battery.

8 Claims, 9 Drawing Sheets

(52) U.S. Cl.
CPC ....... *B60L 2260/54* (2013.01); *B60L 2260/56* (2013.01); *B60W 2050/143* (2013.01); *B60W 2050/146* (2013.01); *B60W 2510/244* (2013.01)

(56) References Cited

U.S. PATENT DOCUMENTS

| | | | |
|---|---|---|---|
| 11,738,656 B2* | 8/2023 | Namiki | B60L 58/16 |
| | | | 705/26.7 |
| 2005/0077877 A1 | 4/2005 | Cawthorne | |
| 2006/0009888 A1 | 1/2006 | Atsumi | |
| 2007/0029974 A1 | 2/2007 | Uchida | |
| 2009/0040033 A1 | 2/2009 | Uchida | |
| 2013/0024061 A1* | 1/2013 | Yagura | B60W 10/26 |
| | | | 180/65.265 |
| 2015/0134169 A1* | 5/2015 | Kam | B60L 58/12 |
| | | | 701/22 |
| 2016/0124053 A1 | 5/2016 | Akaishi et al. | |
| 2018/0257636 A1* | 9/2018 | Mito | B60W 50/14 |
| 2018/0264967 A1* | 9/2018 | Damjanovic | B60K 37/06 |
| 2019/0176639 A1 | 6/2019 | Kumar et al. | |
| 2019/0344665 A1* | 11/2019 | Zapryanov | B60K 37/02 |
| 2022/0274618 A1* | 9/2022 | Charr | B60L 58/12 |

FOREIGN PATENT DOCUMENTS

| | | |
|---|---|---|
| JP | 11-109004 | 4/1999 |
| JP | 2006-025471 | 1/2006 |
| JP | 2007-074891 | 3/2007 |
| JP | 2007-195312 | 8/2007 |
| JP | 2007-274806 A | 10/2007 |
| JP | 2008-308122 | 12/2008 |
| JP | 2013-051115 | 3/2013 |
| JP | 2014-235113 | 12/2014 |
| WO | 2014/195776 | 12/2014 |

OTHER PUBLICATIONS

The EPC Office Action dated Jan. 5, 2023 for the related European Patent Application No. 20868587.5.

International Search Report of PCT application No. PCT/JP2020/033862 dated Nov. 17, 2020.

* cited by examiner

IN-VEHICLE NOTIFICATION DEVICE, NOTIFICATION PROGRAM, AND CALCULATION DEVICE

CROSS-REFERENCE TO RELATED APPLICATIONS

This application is a U.S. national stage application of the PCT International Application No. PCT/JP2020/033862 filed on Sep. 8, 2020, which claims the benefit of foreign priority of Japanese patent application No. 2019-174175 filed on Sep. 25, 2019, the contents all of which are incorporated herein by reference.

BACKGROUND

1. Technical Field

The present invention relates to an in-vehicle notification device, a notification program, and a calculation device that are mounted on an electric vehicle.

2. Description of the Related Art

In recent years, electric vehicles (EV) and plug-in hybrid vehicles (PHV) have become widespread. These electric vehicles are equipped with a secondary battery as a key device. In order to suppress degradation of the secondary battery and extend its life, it is effective to suppress the current rate discharged from the secondary battery to the motor for running. In the case of the electric current vehicles, the discharge current rate can be suppressed when running at a low speed and not suddenly accelerating.

In order to suppress the discharge current rate in the electric vehicles, it is conceivable to set a forcible limit on the current discharged from the secondary battery to the motor for running. For example, in order to prevent a bias in the lithium ion concentration in a lithium ion battery, it is proposed to limit the current by the duration time of discharge (see PTL 1).

CITATION LIST

Patent Literature

PTL 1: Unexamined Japanese Patent Publication No. 2013-51115

SUMMARY

When the electric current is forcibly limited in the electric vehicle, the vehicle cannot be accelerated as the intention of the driver, which may hinder a danger avoidance action.

The present disclosure has been made in view of such a situation, and an object thereof is to provide a technology for suppressing degradation of a secondary battery while ensuring a free driving operation by a driver.

In order to solve the above problem, an in-vehicle notification device of a certain aspect of the present disclosure is an in-vehicle notification device mounted on an electric vehicle, the in-vehicle notification device including: an acquisition unit that acquires a discharge current value discharged from a secondary battery in the electric vehicle to a motor for running in the electric vehicle; and a notification unit that notifies a driver of information indicating an impact of a current driving condition of the driver of the electric vehicle on degradation of the secondary battery in accordance with a discharge current value acquired by the acquisition unit.

Any combinations of the configuration elements described above and modifications of the features of the present disclosure in methods, devices, systems, computer programs, and the like are still effective as aspects of the present disclosure.

According to the present disclosure, it is possible to suppress degradation of a secondary battery while ensuring a free driving operation by the driver.

BRIEF DESCRIPTION OF THE DRAWINGS

FIG. 4 (a) to (c) is view showing schematic examples of a storage degradation rate characteristic map, a charge cycle degradation rate characteristic map, and a discharge cycle degradation rate characteristic map.

FIGS. 9 (a) and (b) is view showing an example in which a bar indicating the running life of an electric vehicle is displayed on a screen.

DETAILED DESCRIPTIONS

Figure 1:
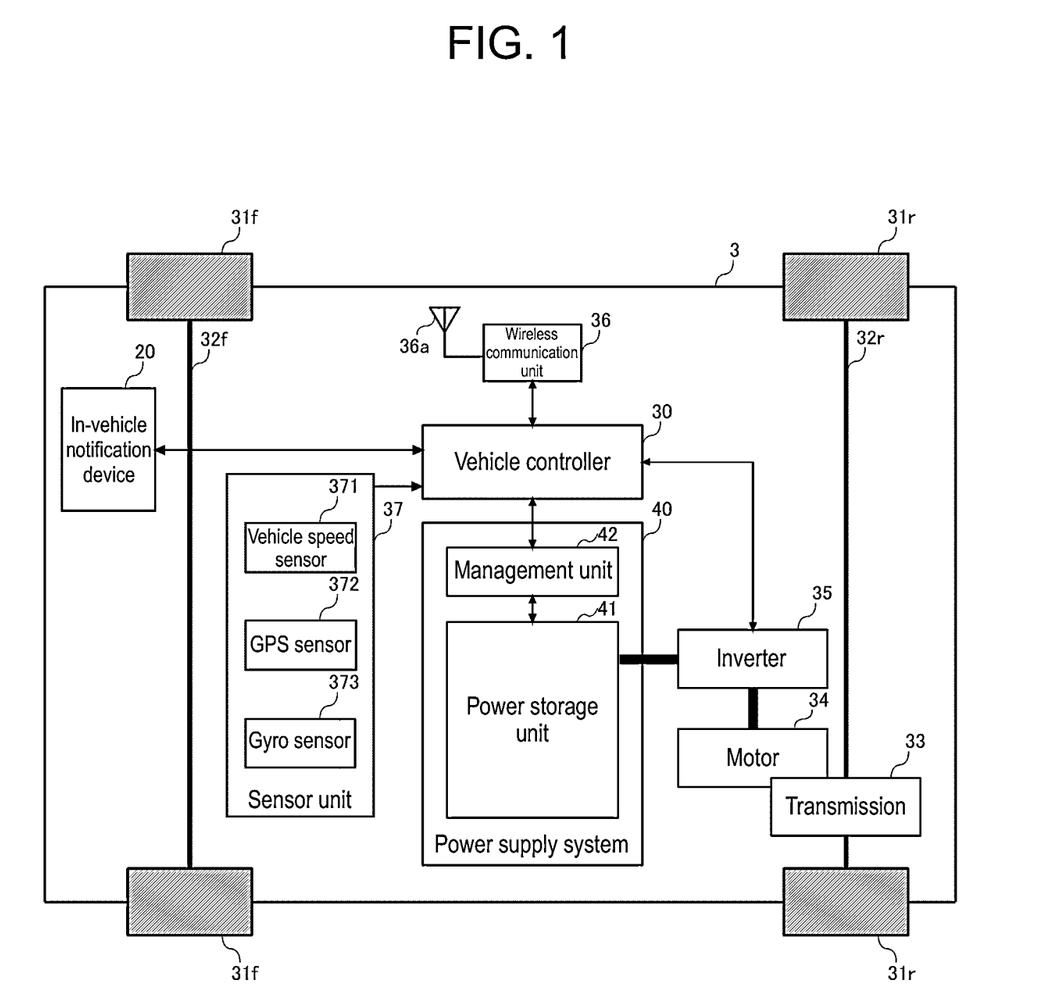
FIG. 1 is a view showing a schematic configuration of an electric vehicle on which an in-vehicle notification device according to an exemplary embodiment is mounted.

FIG. 1 is a view showing a schematic configuration of electric vehicle 3 on which in-vehicle notification device 20 according to an exemplary embodiment is mounted. In the present exemplary embodiment, a pure EV on which an internal-combustion engine is not mounted is assumed as electric vehicle 3. Electric vehicle 3 is a rear-wheel drive (2WD) EV including a pair of front wheels 31*f*, a pair of rear wheels 31*r*, and motor 34 as a power source. The pair of front wheels 31*f* is coupled by front wheel axle 32*f*, and the pair of rear wheels 31*r* is coupled by rear wheel axle 32*r*. Transmission 33 transmits rotation of motor 34 to rear wheel axle 32*r* at a predetermined conversion ratio.

Vehicle controller 30 is a vehicle electronic control unit (ECU) that controls entire electric vehicle 3, and may be configured by, for example, an integrated vehicle control module (VCM). Vehicle controller 30 acquires various pieces of sensor information for detecting a behavior of electric vehicle 3 and/or a surrounding environment of electric vehicle 3 from sensor unit 37 in electric vehicle 3.

Sensor unit 37 is a generic term of sensors installed in electric vehicle 3. FIG. 1 presents vehicle speed sensor 371, GPS sensor 372, and gyro sensor 373 as representative sensors.

Vehicle speed sensor 371 generates a pulse signal proportional to the rotation speed of front wheel axle 32f or rear wheel axle 32r, and transmits the generated pulse signal to vehicle controller 30. Vehicle controller 30 detects the speed of electric vehicle 3 based on the pulse signal received from vehicle speed sensor 371.

GPS sensor 372 detects positional information on electric vehicle 3 and transmits the detected positional information to vehicle controller 30. Specifically, GPS sensor 372 receives, from a plurality of GPS satellites, radio waves including their respective transmission times, and calculates the latitude and longitude of the received point based on the plurality of transmission times included in the plurality of respective received radio waves.

Gyro sensor 373 detects an angular velocity of electric vehicle 3 and transmits the detected angular velocity to vehicle controller 30. Vehicle controller 30 can detect an inclination angle of electric vehicle 3 by integrating the angular velocity received from gyro sensor 373.

Besides this, various sensors are installed in electric vehicle 3. For example, an accelerator pedal position sensor, a brake pedal position sensor, a steering angle sensor, a camera, sonar, and the like are installed.

Wireless communication unit 36 performs signal processing for wireless connection to a network via antenna 36a. Examples of a wireless communication network to which electric vehicle 3 is wirelessly connectable include a cellular phone network (cellular network), a wireless LAN, an electronic toll collection system (ETC), dedicated short range communications (DSRC), vehicle-to-infrastructure (V2I), and vehicle-to-vehicle (V2V).

In-vehicle notification device 20 is a device for notifying the driver of information indicating an impact of the current driving condition of the driver of electric vehicle 3 on degradation of the secondary battery included in power supply system 40. Infotainment apparatuses such as display audio and car navigation systems can be used as in-vehicle notification device 20. Details of in-vehicle notification device 20 will be described later.

Figure 2:
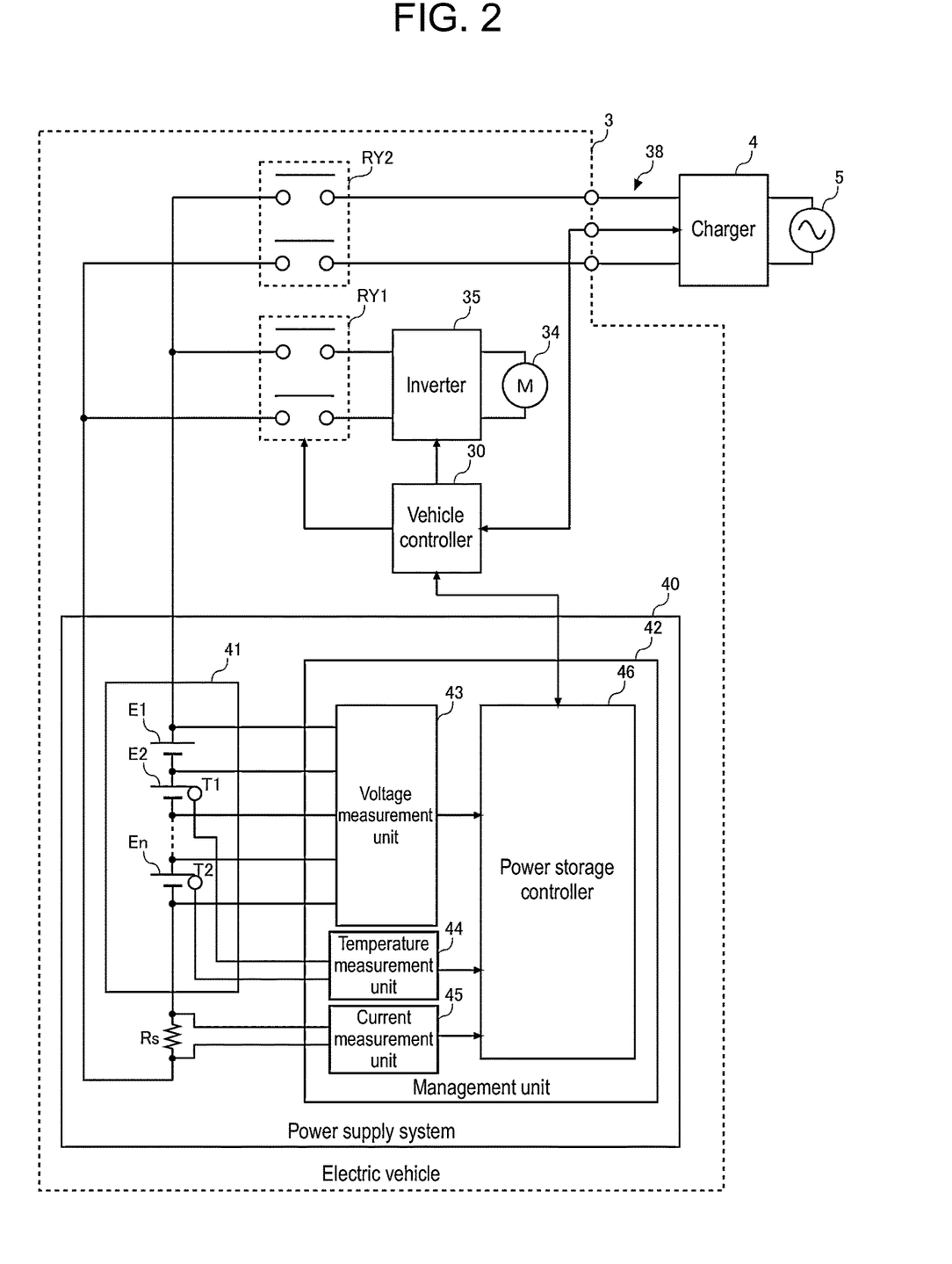
FIG. 2 is a view for explaining a detailed configuration of a power supply system mounted on the electric vehicle shown in FIG. 1.

FIG. 2 is a view for explaining a detailed configuration of power supply system 40 mounted on electric vehicle 3 shown in FIG. 1. Power supply system 40 is connected to motor 34 via first relay RY1 and inverter 35. At the time of power running, inverter 35 converts DC power supplied from power supply system 40 into AC power and supplies the AC power to motor 34. At the time of regeneration, inverter 35 converts AC power supplied from motor 34 into DC power and supplies the DC power to power supply system 40. Motor 34 is a three-phase AC motor, and rotates in accordance with the AC power supplied from inverter 35 at the time of power running. At the time of regeneration, rotational energy due to deceleration is converted into AC power and supplied to inverter 35.

First relay RY1 is a contactor inserted in wiring connecting between power supply system 40 and inverter 35. At the time of running, vehicle controller 30 controls first relay RY1 to an on state (closed state) and electrically connects power supply system 40 with a power system of electric vehicle 3. At the time of not running, vehicle controller 30 controls first relay RY1 to an off state (open state) in principle, and electrically interrupts power supply system 40 and the power system of electric vehicle 3. Instead of the relay, another type of switch such as a semiconductor switch may be used.

By connecting electric vehicle 3 to charger 4 via charging cable 38, it is possible to charge power storage unit 41 in power supply system 40 from outside. Charger 4 may be a quick charger having a power conversion function of converting three-phase AC power supplied from commercial power system 5 into DC power. Charger 4 generates DC power by full-wave rectifying AC power supplied from commercial power system 5 and smoothing it with a filter.

Charging cable 38 that adopts the controller area network (CAN) method includes a communication line in addition to a power line. When the charging port of electric vehicle 3 and charger 4 are connected via charging cable 38, vehicle controller 30 establishes a communication channel with a control unit in charger 4. In the charging cable adopting the power line communication (PLC) method, the communication signal between vehicle controller 30 and the control unit in charger 4 is superimposed on the power line and transmitted.

A communication channel is established between vehicle controller 30 and management unit 42 of power supply system 40 via an in-vehicle network (e.g., CAN). The communication standard between vehicle controller 30 and the control unit in charger 4 and the communication standard between vehicle controller 30 and management unit 42 of power supply system 40 may be the same or different. When the communication standards of both are different, vehicle controller 30 plays the gateway function.

In electric vehicle 3, second relay RY2 is inserted in wiring connecting between power supply system 40 and charger 4. Instead of the relay, another type of switch such as a semiconductor switch may be used. At the time of charging power storage unit 41 from charger 4, vehicle controller 30 and management unit 42 operate in cooperation together. Vehicle controller 30 and management unit 42 control second relay RY2 to an on state (closed state) before charge is started from charger 4, and to an off state (open state) after the charge is finished.

When charger 4 is a normal charger, charge is generally performed with single-phase 100/200 V AC power. In a case of AC charge, AC power is converted into DC power by an AC/DC converter (not illustrated) inserted between second relay RY2 and power supply system 40.

Power supply system 40 includes power storage unit 41 and management unit 42, and power storage unit 41 includes a plurality of cells E1 to En connected in series. Power storage unit 41 may include a plurality of battery modules connected in series and serial parallel. For the cell, a lithium ion battery cell, a nickel metal hydride battery cell, a lead battery cell, or the like can be used. Hereinafter, in the present description, an example where a lithium ion battery cell (nominal voltage of 3.6 V to 3.7 V) is used is assumed. The number of series connections of cells E1 to En is determined in accordance with a drive voltage of motor 34.

Shunt resistor Rs is connected in series with the plurality of cells E1 to En. Shunt resistor Rs functions as a current detection element. A Hall element may be used in place of shunt resistor Rs. A plurality of temperature sensors T1 and T2 for detecting temperature of the plurality of cells E1 to En are installed in power storage unit 41. One temperature sensor may be provided in the battery module, or one temperature sensor may be provided for each of a plurality of cells. For example, a thermistor can be used for temperature sensors T1 and T2.

Management unit 42 includes voltage measurement unit 43, temperature measurement unit 44, current measurement unit 45, and power storage controller 46. A plurality of voltage lines are connected between nodes of the plurality of cells E1 to En connected in series and voltage measurement unit 43. Voltage measurement unit 43 measures voltage of each of cells E1 to En by measuring a voltage between two adjacent voltage lines. Voltage measurement unit 43 transmits the measured voltage of each of cells E1 to En to power storage controller 46.

Because voltage measurement unit 43 is high in voltage with respect to power storage controller 46, voltage measurement unit 43 and power storage controller 46 are connected by a communication line in an insulated state. Voltage measurement unit 43 can include an application specific integrated circuit (ASIC) or general-purpose analog front-end IC. Voltage measurement unit 43 includes a multiplexer and an A/D converter. The multiplexer outputs the voltage between two adjacent voltage lines to the A/D converter in order from the top. The A/D converter converts an analog voltage input from the multiplexer into a digital value.

Temperature measurement unit 44 includes a voltage dividing resistor and an A/D converter. The A/D converter sequentially converts a plurality of analog voltages divided by the plurality of temperature sensors T1 and T2 and a plurality of the voltage dividing resistors into digital values, and outputs the digital values to power storage controller 46. Power storage controller 46 estimates the temperatures of the plurality of cells E1 to En based on the digital values. For example, power storage controller 46 estimates the temperature of each of cells E1 to En based on a value measured by a temperature sensor most adjacent to each of cells E1 to En.

Current measurement unit 45 includes a differential amplifier and an A/D converter. The differential amplifier amplifies the voltage at both ends of shunt resistor Rs and outputs the voltage to the A/D converter. The A/D converter converts the voltage input from the differential amplifier into a digital value and outputs the digital value to power storage controller 46. Power storage controller 46 estimates the current flowing through the plurality of cells E1 to En based on the digital values.

In the case where an A/D converter is mounted in power storage controller 46 and an analog input port is installed in power storage controller 46, temperature measurement unit 44 and current measurement unit 45 may output an analog voltage to power storage controller 46, and may convert the analog voltage into a digital value by the A/D converter in power storage controller 46.

Power storage controller 46 manages the states of the plurality of cells E1 to En based on the voltages, temperatures, and currents of the plurality of cells E1 to En measured by voltage measurement unit 43, temperature measurement unit 44, and current measurement unit 45. An in-vehicle network connects between power storage controller 46 and vehicle controller 30. For example, CAN or the local interconnect network (LIN) can be used as the in-vehicle network.

Power storage controller 46 can include a microcomputer and a nonvolatile memory (e.g., an electrically erasable programmable read-only memory (EEPROM) and a flash memory). Power storage controller 46 estimates a state of charge (SOC) and a state of health (SOH) of each of the plurality of cells E1 to En.

Power storage controller 46 estimates the SOC by combining an open circuit voltage (OCV) method and a current integration method. The OCV method is a method of estimating the SOC based on the OCV of each of cells E1 to En measured by voltage measurement unit 43 and the SOC-OCV curve. The current integration method is a method of estimating the SOC based on the OCV at the start of charging and discharging of each of cells E1 to En and an integrated value of a current measured by current measurement unit 45. In the current integration method, a measurement error of current measurement unit 45 accumulates as the charging and discharging time becomes longer. Thus, the SOC estimated by the current integration method needs to be corrected using the SOC estimated by the OCV method.

The SOH is defined by a ratio of a current full charge capacity (FCC) to an initial FCC, and a lower numerical value (closer to 0%) indicates that degradation has progressed. The SOH may be obtained by capacity measurement by complete charge and discharge, or may be obtained by adding storage degradation and cycle degradation.

The SOH can also be estimated based on a correlation with an internal resistance of a cell. The internal resistance can be estimated by dividing a voltage drop occurring when a predetermined current flows through a cell for a predetermined time by the current value. The internal resistance decreases as the temperature rises, and increases as the SOH decreases.

Power storage controller 46 determines the voltage, temperature, current, SOC, and SOH of entire power storage unit 41 based on the voltages, temperatures, currents, SOCs, and SOHs of the plurality of cells E1 to En. Power storage controller 46 transmits the voltage, temperature, current, SOC, and SOH of entire power storage unit 41 to vehicle controller 30 via the in-vehicle network.

Figure 3:
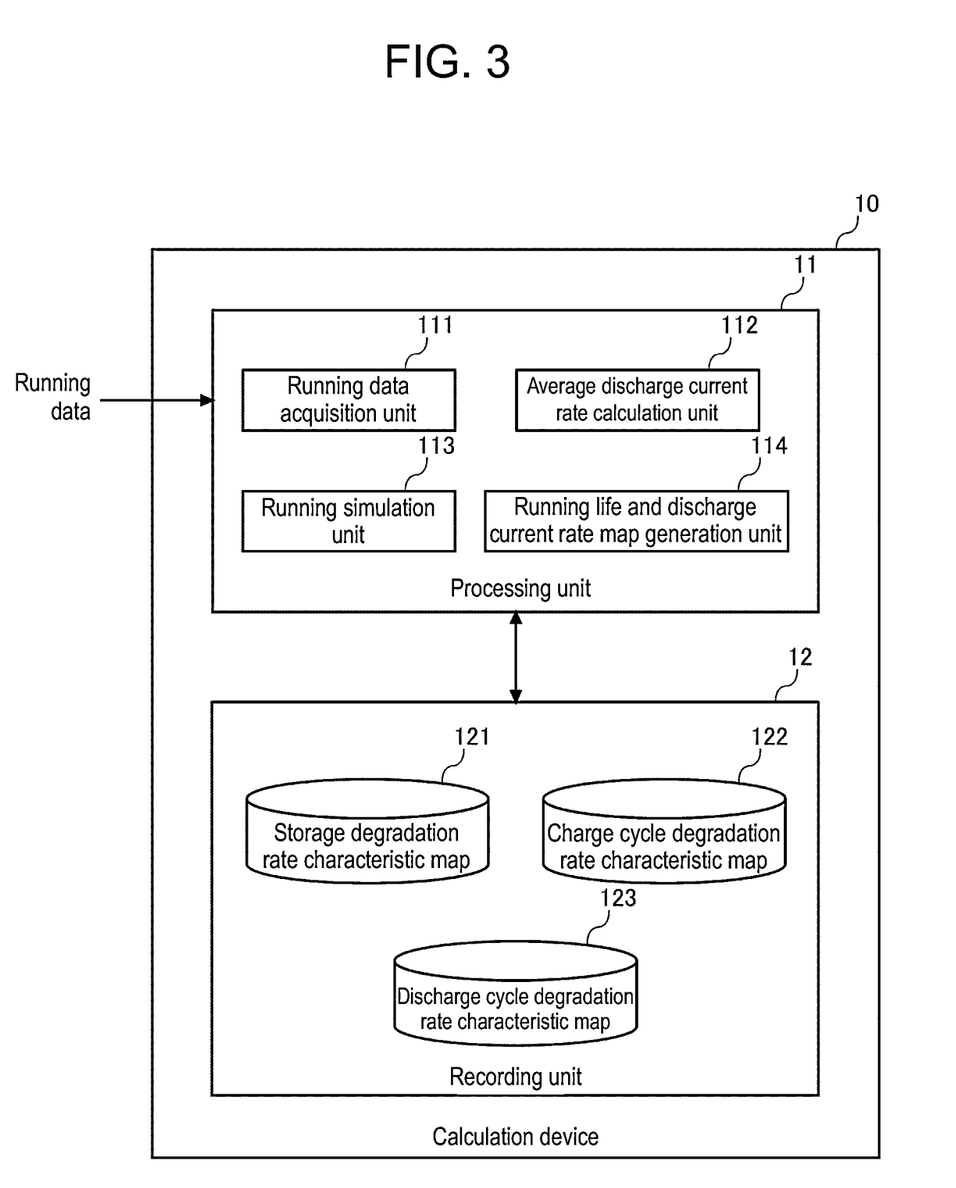
FIG. 3 is a view showing a configuration example of a calculation device according to an exemplary embodiment.

FIG. 3 is a view showing a configuration example of calculation device 10 according to the exemplary embodiment. Calculation device 10 is a device for generating a running life and discharge current rate map used in in-vehicle notification device 20. Calculation device 10 includes a server or a PC installed in the manufacturer of in-vehicle notification device 20 or the vendor of the driver notification program installed in in-vehicle notification device 20. A cloud server installed in a data center may be used.

Calculation device 10 includes processing unit 11 and recording unit 12. Processing unit 11 includes running data acquisition unit 111, average discharge current rate calculation unit 112, running simulation unit 113, and running life and discharge current rate map generation unit 114. The function of processing unit 11 can be achieved by cooperation of a hardware resource and a software resource, or by the hardware resource alone. As the hardware resources, a CPU, a ROM, a RAM, a graphics processing unit (GPU), an ASIC, a field programmable gate array (FPGA), and other LSIs can be used. As the software resources, an operating system, an application, and other programs can be used.

Recording unit 12 includes storage degradation rate characteristic map 121, charge cycle degradation rate characteristic map 122, and discharge cycle degradation rate characteristic map 123. Recording unit 12 includes a nonvolatile recording medium such as a hard disk drive (HDD) and a solid state drive (SSD), and records various programs and data.

Storage degradation rate characteristic map 121, charge cycle degradation rate characteristic map 122, and discharge cycle degradation rate characteristic map 123 are maps of the storage degradation rate characteristics, the charge cycle degradation rate characteristics, and the discharge cycle degradation rate characteristics of the secondary battery mounted on electric vehicle 3. The storage degradation rate characteristics, the charge cycle degradation rate characteristics, and the discharge cycle degradation rate characteristics of the secondary battery are derived in advance for each secondary battery product by experiments and simulations by the battery manufacturers. Data derived from other evaluation organizations may be used.

The storage degradation is degradation that progresses over time in accordance with the temperature at each time point and the SOC at each time point of the secondary battery. The storage degradation progresses as time goes, regardless of whether or not charge or discharge is being performed. The storage degradation mainly occurs due to formation of a solid electrolyte interphase (SEI) film on a negative electrode. The storage degradation depends on the SOC and temperature at each time point. In general, the higher the SOC at each time point is or the higher the temperature at each time point is, the more the storage degradation rate increases.

The cycle degradation is degradation that progresses with increase in a number of times of charge and discharge. The cycle degradation mainly occurs due to cracking or peeling by expansion or contraction of an active material. The cycle degradation depends on the current rate, the SOC range to be used, and the temperature. In general, the higher the current rate is, the wider the SOC range to be used is, and the higher the temperature is, the more the cycle degradation rate increases.

Figure 4:
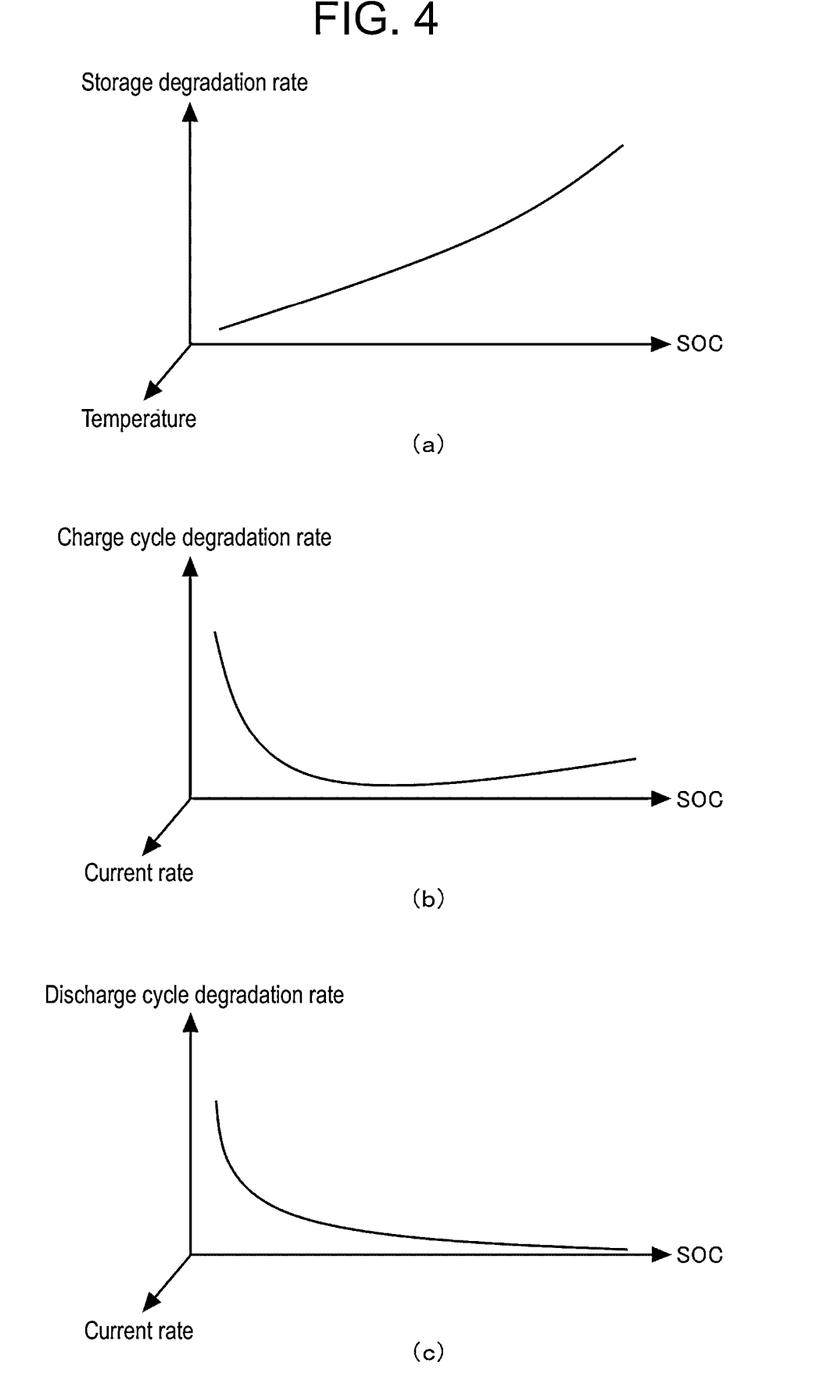

FIG. 4 (a) to (c) is view showing schematic examples of the storage degradation rate characteristic map, the charge cycle degradation rate characteristic map, and the discharge cycle degradation rate characteristic map. FIG. 4 (a) shows a schematic example of the storage degradation rate characteristic map. The X-axis represents the SOC [%], the Y-axis represents the temperature [° C.], and the Z-axis represents the storage degradation rate [%/√h]. It is known that the storage degradation progresses at the 0.5 power law (square root) of time h (hour). As shown in FIG. 4 (a), the higher the SOC is, the faster the storage degradation rate becomes.

FIG. 4 (b) shows a schematic example of the charge cycle degradation rate characteristic map. The X-axis represents the SOC usage range [%], the Y-axis represents the current rate [C], and the Z-axis represents the charge cycle degradation rate [%/√Ah]. It is known that the cycle degradation progresses at the 0.5 power law (square root) in ampere hour (Ah). As shown in FIG. 4 (b), charging in a low SOC region increases the charge cycle degradation rate. Also in a case of charging in a high SOC region, the charge cycle degradation rate becomes faster, although not as much as in the low SOC region.

FIG. 4 (c) shows a schematic example of the discharge cycle degradation rate characteristic map. The X-axis represents the SOC usage range [%], the Y-axis represents the current rate [C], and the Z-axis represents the discharge cycle degradation rate [%/√Ah]. The more discharging in a low SOC region is performed, the faster the discharge cycle degradation rate becomes.

The cycle degradation characteristics do not contribute as much as the current rate does, but are also affected by temperature. Therefore, in order to raise the estimation accuracy of the cycle degradation rate, it is preferable to prepare a cycle degradation characteristic in which the relationship between the SOC usage range and the cycle degradation rate is defined for each two-dimensional combination of a plurality of current rates and a plurality of temperatures. On the other hand, when a simple cycle degradation rate characteristic map is generated, the temperature is regarded as a normal temperature, and a cycle degradation rate characteristic for each of a plurality of current rates only needs be prepared.

The storage degradation rate characteristic, the charge cycle degradation rate characteristic, and the discharge cycle degradation rate characteristic may be defined by a function instead of a map.

Running data acquisition unit 111 of calculation device 10 acquires a plurality of daily running pattern data of electric vehicle 3. For the daily running pattern data, it is possible to use past actual measurement data of the same or similar model as electric vehicle 3 to which the secondary battery is scheduled to be mounted. The daily running pattern data includes at least daily current transition of secondary battery. At least one of daily SOC transition and temperature transition of the secondary battery may be included. As the daily running pattern data, standard running pattern data used for calculating the fuel consumption (electricity cost) may be used.

Average discharge current rate calculation unit 112 calculates the average daily discharge current rate from the daily running pattern data. Average discharge current rate calculation unit 112 calculates, from daily running pattern data, the period of discharging from the secondary battery, and the average discharge current value of that period, and obtains the average daily discharge current rate. Average discharge current rate calculation unit 112 obtains the average daily discharge current rate for each of the plurality of running pattern data.

Figure 5:
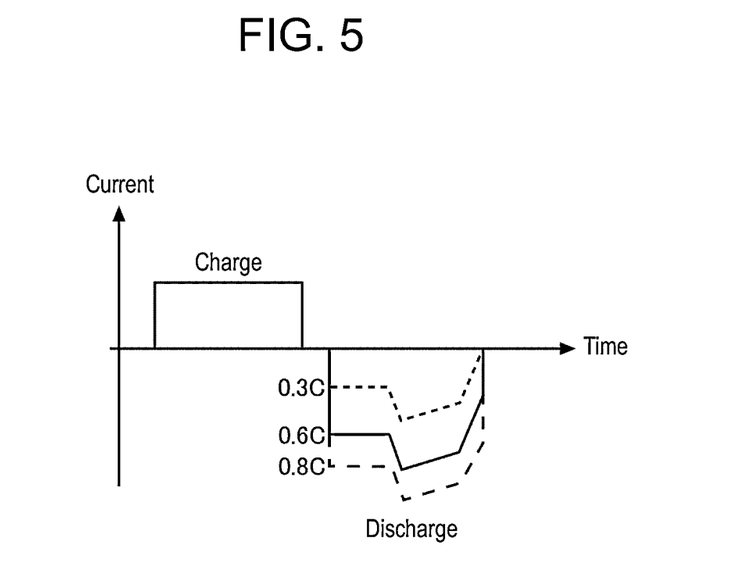
FIG. 5 is a view showing a specific example of a daily current pattern included in daily running pattern data.

FIG. 5 is a view showing a specific example of a daily current pattern included in daily running pattern data. FIG. 5 shows current patterns included in the three running pattern data. The charging period and charging current value are common to the three current patterns. The average daily discharge current rate of a first current pattern (dotted line (dense)) is 0.3 C, the average daily discharge current rate of a second current pattern (solid line) is 0.6 C, and the average daily discharge current rate of a third current pattern (dotted (sparse)) is 0.8 C.

Running simulation unit 113 predicts the running life of electric vehicle 3 for each running pattern data based on the storage degradation rate characteristics, charge cycle degradation rate characteristics, and discharge cycle degradation rate characteristics of the secondary battery and a plurality of daily running pattern data. The running life of electric vehicle 3 corresponds to the life of the secondary battery as an in-vehicle battery. Running simulation unit 113 predicts the number of years in which electric vehicle 3 runs until the SOH of the secondary battery reaches the value (e.g., 80%) set as the life of the in-vehicle battery when the same running pattern is repeated every day for each running pattern data. The accumulated running distance may be used for prediction instead of the number of years of running.

When the running pattern data does not include the temperature data, running simulation unit 113 assumes that the temperature is a normal temperature, and predicts, as the running life of electric vehicle 3, the number of years until the SOH of the secondary battery reaches the set value based on the current transition. The temperature transition may be assumed based on the meteorological data of the destination. SOC transition depends on current transition, SOH transition, and temperature transition.

Running life and discharge current rate map generation unit 114 plots a combination of the average daily discharge current rate of a plurality of running pattern data and the running life years (or running life distance) corresponding to the plurality of running pattern data, and generates a running life and discharge current rate map by curve regression. The relationship between the running life of electric vehicle 3 and the discharge current rate of the secondary battery may be defined by a function instead of a map.

Figure 6:
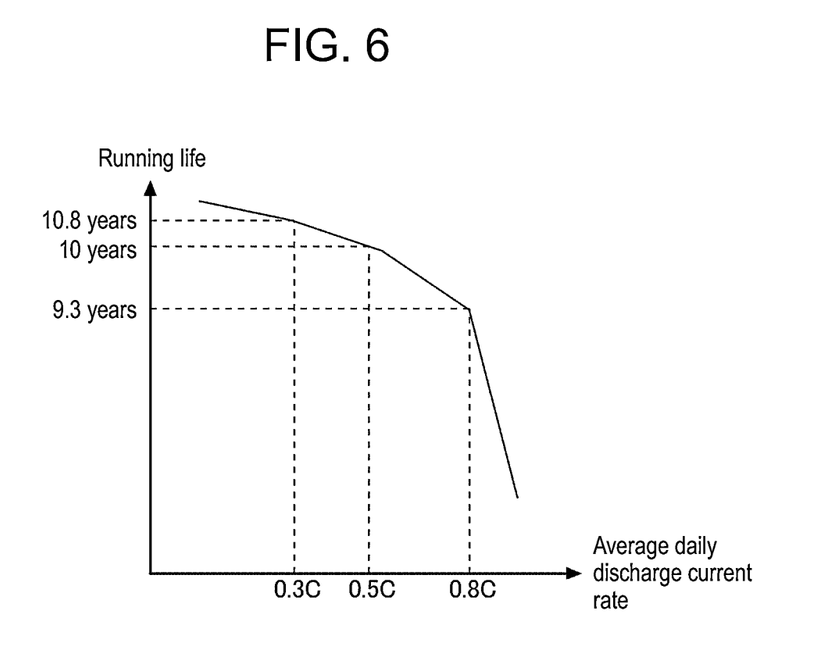
FIG. 6 is a view showing an example of a running life and discharge current rate map.

FIG. 6 is a view showing an example of a running life and discharge current rate map. In the example shown in FIG. 6, the running life becomes 10.8 years when the average daily discharge current rate is 0.3 C, and the running life becomes 9.3 years when the average daily discharge current rate is 0.8 C.

Figure 7:
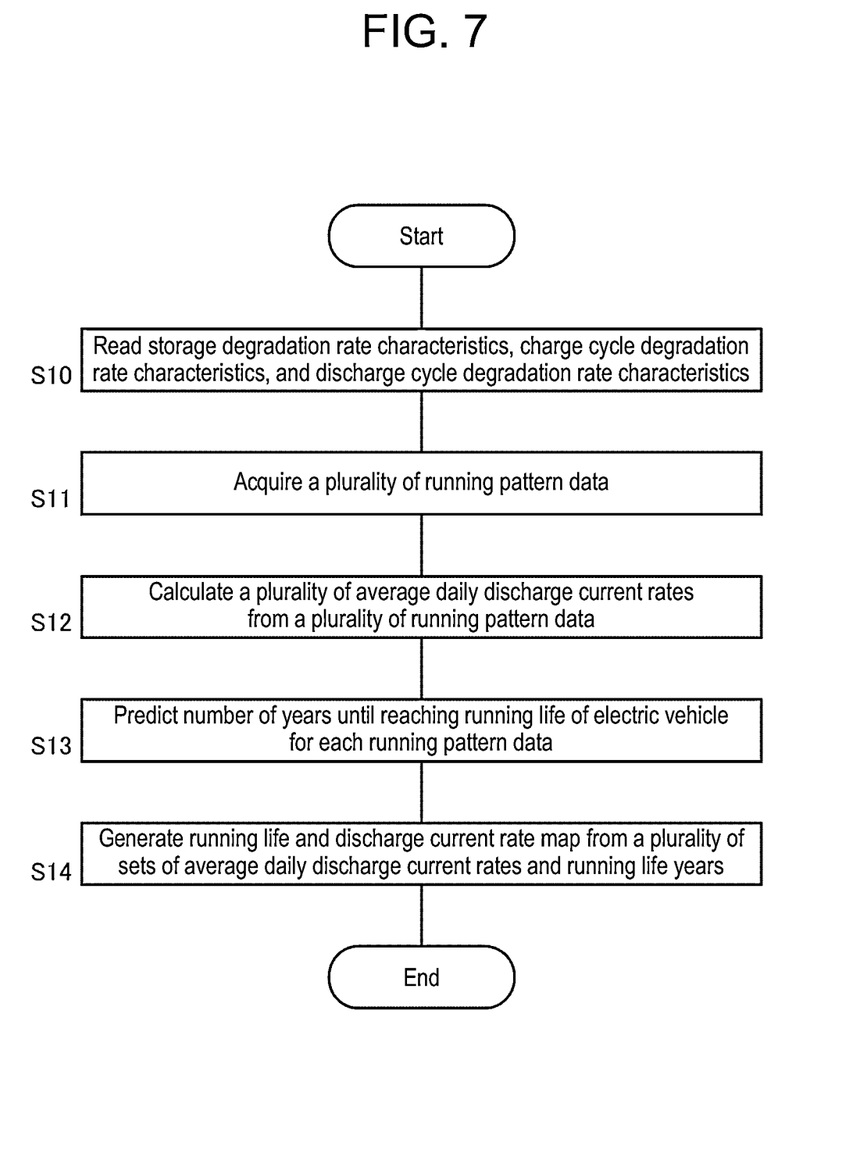
FIG. 7 is a flowchart showing a flow of a running life and discharge current rate map generation process by a calculation device according to an exemplary embodiment.

FIG. 7 is a flowchart showing the flow of a running life and discharge current rate map generation process by calculation device 10 according to the exemplary embodiment. Running simulation unit 113 reads the storage degradation rate characteristics, the charge cycle degradation rate characteristics, and the discharge cycle degradation rate characteristics of the secondary battery from recording unit 12 (S10). Running data acquisition unit 111 acquires a plurality of daily running pattern data of electric vehicle 3 (S11). Average discharge current rate calculation unit 112 calculates the plurality of corresponding average daily discharge current rates from the plurality of daily running pattern data (S12).

Running simulation unit 113 predicts the running life of electric vehicle 3 for each running pattern data based on the storage degradation rate characteristics, charge cycle degradation rate characteristics, and discharge cycle degradation rate characteristics of the secondary battery and a plurality of daily running pattern data (S13). Running life and discharge current rate map generation unit 114 generates a running life and discharge current rate map from a plurality of sets of average daily discharge current rates and running life years (or running life distance) (S14). The generated running life and discharge current rate map is provided to in-vehicle notification device 20.

Figure 8:
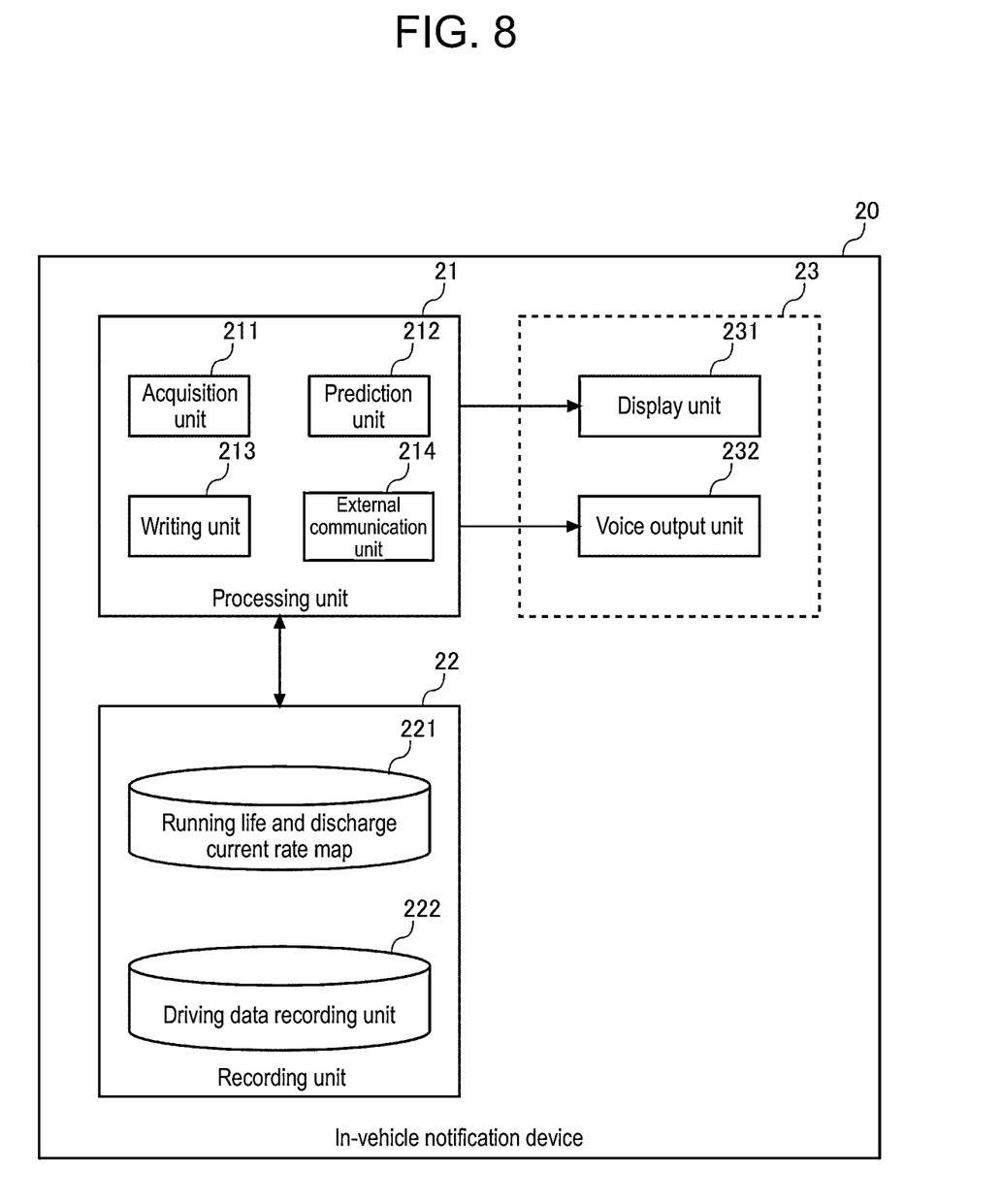
FIG. 8 is a view showing a configuration example of an in-vehicle notification device according to an exemplary embodiment.

FIG. 8 is a view showing a configuration example of in-vehicle notification device 20 according to the exemplary embodiment. In-vehicle notification device 20 is installed at a position (e.g., dashboard) within the driver's field of view. As described above, in-vehicle notification device 20 may be implemented as a function of the display audio or car navigation system, or may be configured as an independent device.

In-vehicle notification device 20 includes processing unit 21, recording unit 22, and notification unit 23. Processing unit 11 includes acquisition unit 211, prediction unit 212, writing unit 213, and external communication unit 214.

The function of processing unit 21 can be achieved by cooperation of a hardware resource and a software resource, or by the hardware resource alone. As the hardware resources, a CPU, a ROM, a RAM, a GPU, an ASIC, an FPGA, and other LSIs can be used. As the software resources, an operating system, firmware, an application, and other programs can be used. A system-on-a-Chip (SoC) may be used as a hardware resource.

Recording unit 22 includes running life and discharge current rate map 221 and running data recording unit 222. Recording unit 22 includes a nonvolatile recording medium such as an HDD or an SSD, and records various programs and data. Running life and discharge current rate map 221 is a running life and discharge current rate map generated by calculation device 10. Running life and discharge current rate map 221 may be written in advance before in-vehicle notification device 20 is shipped, or may be written in an ex-post manner when the operation notification program is installed.

In-vehicle notification device 20 includes display unit 231 and voice output unit 232 as notification unit 23. Display unit 231 includes a liquid crystal display or an organic EL display, and displays video data generated by processing unit 21. Voice output unit 232 includes a speaker and outputs voice data generated by processing unit 21.

An in-vehicle network connects between processing unit 21 of in-vehicle notification device 20 and vehicle controller 30. Acquisition unit 211 of processing unit 21 acquires, from vehicle controller 30 via the in-vehicle network, the discharge current value discharged from power storage unit 41 to motor 34.

Prediction unit 212 reads a running life and discharge current rate map from recording unit 12, refers to the running life and discharge current rate map having been read, specifies the running life corresponding to the acquired discharge current value, and predicts the running life of electric vehicle 3 in accordance with the current driving condition. The discharge current depends on the running speed and the acceleration of electric vehicle 3. The higher the running speed is, the larger the discharge current becomes, and the lower the running speed is, the smaller the discharge current becomes. The larger the acceleration, the larger the discharge current, and the smaller the acceleration, the smaller the discharge current. The running speed and the acceleration largely depend on the driver's accelerator position. In addition, the running speed and the acceleration depend on the road conditions (specifically, the slope angle of the road and the coefficient of friction), the weather conditions, and the coefficient of friction of the tires.

Notification unit 23 notifies the driver of information in accordance with the predicted running life of electric vehicle 3. The information in accordance with the running life may be visually notified to the driver by display unit 231, may be audibly notified to the driver by voice output unit 232, or may be notified to the driver by both of them. For example, display unit 231 displays, on the screen, a scale indicating the standard of the running life of electric vehicle 3 and a bar indicating the running life of electric vehicle 3 predicted based on the current discharge current value.

Figure 9:
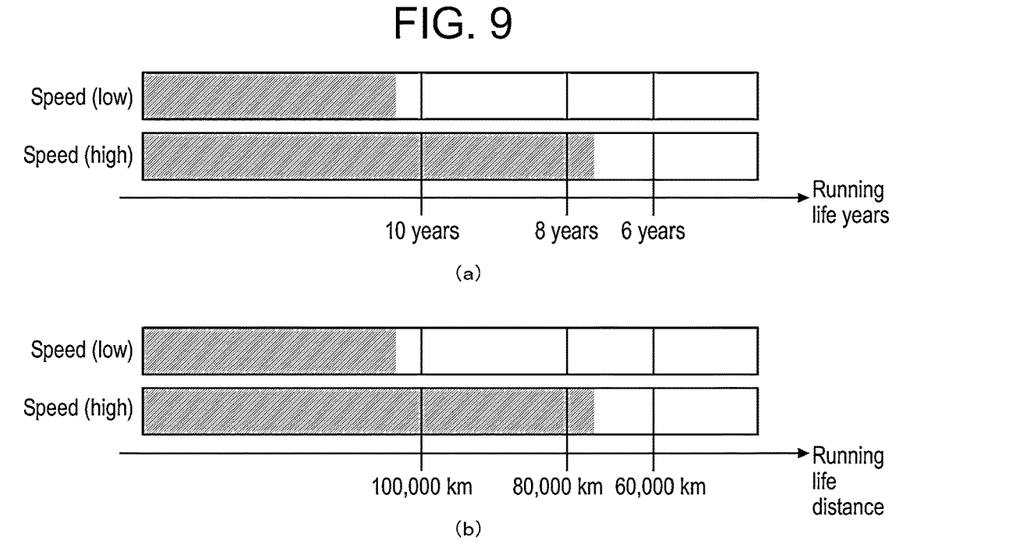

FIGS. 9 (a) and (b) is view showing an example in which a bar indicating the running life of electric vehicle 3 is displayed on a screen. FIG. 9 (a) shows an example of displaying the running life in the number of years, and FIG. 9 (b) shows an example of displaying the running life in distance. The hatched part of the bar dynamically changes from side to side in accordance with the acquired discharge current value. The upper bar indicates the predicted running life in a state of low speeds, and visually presents the driver that if the current driving condition continues, running another 10 years or more will be possible, or running another 100,000 km or more will be possible. The lower bar indicates the predicted running life in a state of high speeds, and visually presents the driver that if the current driving condition continues, running less than another 8 years will only be possible, or running less than another 80,000 km will only be possible.

When prediction unit 212 refers to the running life and discharge current rate map and converts the acquired discharge current value into the running life as it is as a discharge current rate, the running life fluctuates with high sensitivity with respect to the change in the accelerator position of the driver. The hatched part of the bar shown in FIGS. 9 (a) and (b) expands and contracts in real time according to a change in the driving condition. By seeing the change in the bar, the driver can realize the impact of his own accelerator operation and brake operation on the life of the secondary battery.

When prediction unit 212 calculates the average daily discharge current rate based on the acquired discharge current value, and converts the calculated average daily discharge current rate into the running life with reference to the running life and discharge current rate map, the change in running life becomes gradual. The driver can recognize the impact of his own drive operation on the life of the secondary battery throughout the day.

Voice output unit 232 outputs a voice message including the number of years or the distance indicating the running life of electric vehicle 3 predicted based on the current discharge current value. Voice output unit 232 may periodically output the voice message, or may output the voice message at the timing when the number of years or the distance indicating the predicted running life of electric vehicle 3 changes equal to or greater than a reference value.

When electric vehicle 3 is a commercial vehicle used by a delivery company, a bus company, a taxi company, or the like, the company often sets a minimum line of running life of electric vehicle 3 from a management point of view.

When the running life of electric vehicle 3 predicted based on the current discharge current value does not exceed the minimum line of running life set by the company, display unit 231 may highlight the bar of the above-mentioned running life of electric vehicle 3. For example, display unit 231 may display the bar of running life in red while the running life does not exceed the minimum line, and may display the bar of running life in blue when the running life exceeds the minimum line.

Voice output unit 232 may output a voice alert message when the running life of electric vehicle 3 predicted based on the current discharge current value falls below the minimum line of running life set by the company. For example, a voice message such as "Please slow down." is output.

Even if the discharge current rate is the same as shown in FIG. 4 (c), the discharge cycle degradation rate becomes different depending on the SOC usage range. Hereinafter, an example of predicting the running life based on the discharge current rate and the SOC usage range will be described.

A correction ratio calculation unit (not illustrated) of calculation device 10 calculates the average degradation rate of all SOC usage ranges (0 to 10, 10 to 20, 20 to 30, 30 to 40, 40 to 50, 50 to 60, 60 to 70, 70 to 80, 80 to 90, 90 to 100) for each discharge current rate based on the discharge cycle degradation rate characteristics. The correction ratio calculation unit calculates, as the SOC correction ratio, the ratio between the calculated average degradation rate and the degradation rate of each SOC usage range. The calculated SOC correction ratio is provided to in-vehicle notification device 20 together with the running life and discharge current rate map.

Figure 10:
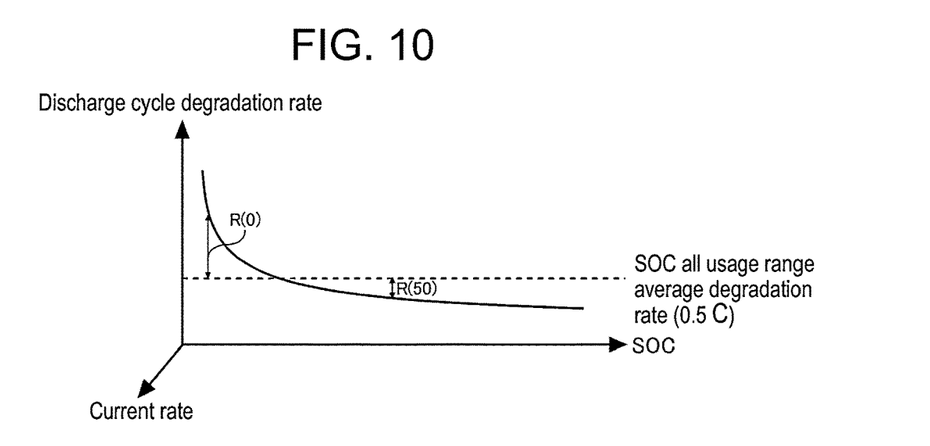
FIG. 10 is a view in which a specific example of a process of calculating an SOC correction ratio from the discharge cycle degradation rate characteristic is shown in a graph.

FIG. 10 is a view in which a specific example of the process of calculating an SOC correction ratio from the discharge cycle degradation rate characteristic is shown in a graph. The graph shown in FIG. 10 indicates, by a horizontal line, the average degradation rate of the entire SOC usage range when the discharge current rate is 0.5 C. The graph also indicates ratio R(0) of the degradation rate when the SOC usage range is 0 to 10% and ratio R(50) of the degradation rate when the SOC usage range is 50 to 60% with respect to the average degradation rate.

Figure 11:
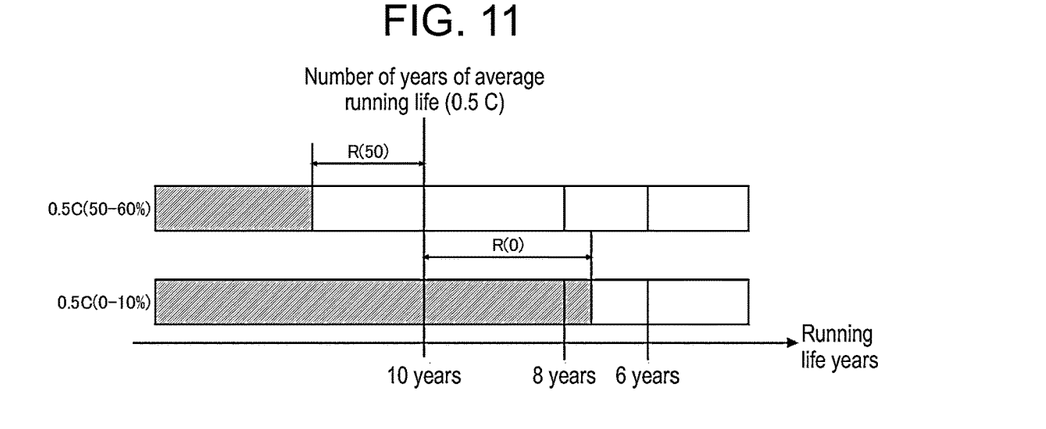
FIG. 11 is a view showing an example in a case where a bar indicating the running life of the electric vehicle is displayed on the screen in consideration of an impact of a usage range of SOC.

FIG. 11 is a view showing an example in a case where a bar indicating the running life of electric vehicle 3 is displayed on the screen in consideration of an impact of a usage range of SOC. The upper bar indicates the predicted running life when the discharge current rate is 0.5 C and the SOC usage range is 50 to 60%. The lower bar indicates the predicted running life when the discharge current rate is 0.5 C and the SOC usage range is 0 to 10%. The position of each number of years of predicted running life can be derived by multiplying the number of years of average running life when the discharge current rate is 0.5 C by ratio R(50) and ratio R(0), respectively.

Figure 12:
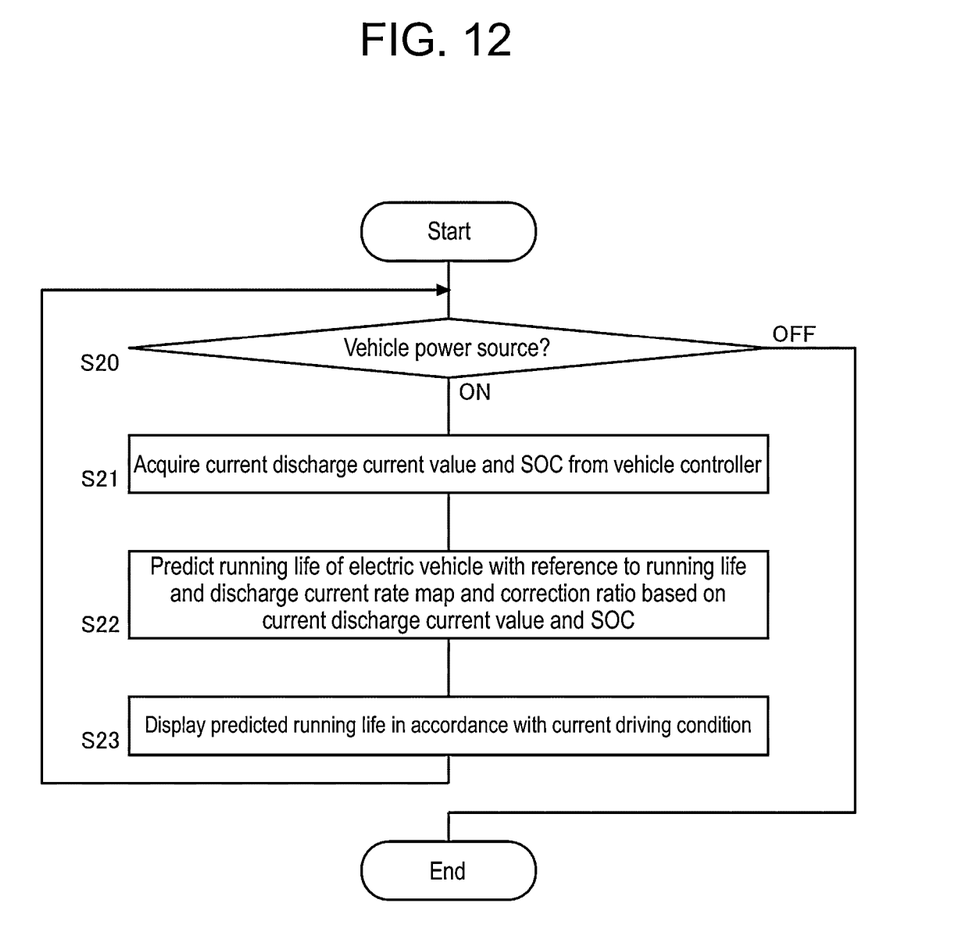
FIG. 12 is a flowchart showing a flow of a display process of a predicted running life by the in-vehicle notification device according to an exemplary embodiment.

FIG. 12 is a flowchart showing a flow of a display process of a predicted running life by in-vehicle notification device 20 according to the exemplary embodiment. When electric vehicle 3 is powered on (ON in S20), acquisition unit 211 acquires the current discharge current value and SOC of power storage unit 41 from vehicle controller 30 via the in-vehicle network (S21). Prediction unit 212 reads the running life and discharge current rate map and the SOC correction ratio from recording unit 12. With reference to the running life and discharge current rate map and the SOC correction ratio, based on the acquired current discharge current value and SOC, prediction unit 212 predicts the running life of electric vehicle 3 in accordance with the current driving condition (S22). Display unit 231 displays the predicted running life of electric vehicle 3 in accordance with the current driving condition (S23). The processes of the above step S21 to step S23 are repeatedly executed (ON in S20) until electric vehicle 3 is powered off (OFF in S20).

Writing unit 213 of in-vehicle notification device 20 writes, into running data recording unit 222, the current transition of the secondary battery in power storage unit 41 based on the driving operation of the driver. In addition to the current transition of the secondary battery, the SOC transition, the temperature transition, and the voltage transition may be included in the running data.

External communication unit 214 periodically transmits the running data recorded in running data recording unit 222 to the management system of the company that owns electric vehicle 3. The management system may include a server or a PC of the company, or may include a cloud server installed in a data center. The management system evaluates the driving data for each driver. For example, when the predicted running life corresponding to the average daily discharge current rate calculated from the running data falls below the minimum line of running life set by the company, the evaluation of the driver becomes negative. The larger the degree of falling below is, the larger the degree of negative evaluation becomes. On the other hand, when the predicted running life exceeds the minimum line, the evaluation of the driver becomes positive. The larger the degree of exceeding is, the larger the degree of positive evaluation becomes. Driver evaluation is reflected in salary, bonus, and performance review.

According to the present exemplary embodiment as described above, the driver is notified of a rough indication of the running life in accordance with the current driving condition without forcible current limitation. This makes it possible to suppress degradation of a secondary battery while ensuring a free driving operation by the driver. When a danger occurs during driving, the driver can accelerate electric vehicle 3 as intended and can take a danger avoidance action. Since the bar indicating a rough indication of the running life changes in real time in accordance with the accelerator operation or the brake operation of the driver, the driver can realize as to what kind of driving to contribute to degradation suppression of the secondary battery.

Since the running life and discharge current rate map is generated based on the cycle degradation rate characteristic map generated separately for charging and discharging, the running life can be highly accurately predicted from the discharge current value in accordance with the current driving condition. By considering the current SOC usage range, it is possible to predict the running life with even higher accuracy.

Since it becomes possible to evaluate driving from the point of view of degradation suppression of the secondary battery, it is possible to return the profit from degradation suppression of the secondary battery to the driver and to utilize it for evaluation of the driving skill of the driver. Since the driver is given an incentive for driving that contributes to degradation suppression of the secondary battery, the driver will keep in mind driving that contributes to degradation suppression of the secondary battery.

The present disclosure has been described above according to the exemplary embodiment. It will be understood by a person of ordinary skill in the art that the exemplary embodiment is merely an example, various modified examples in combinations of configuration elements and processing processes of the exemplary embodiments are possible, and such modified examples also fall within the scope of the present disclosure.

In the example shown in FIG. 10, the correction ratio calculation unit (not illustrated) of calculation device 10 calculates, as the SOC correction ratio, the ratio between the average degradation rate of all SOC usage ranges and each SOC usage range for each discharge current rate based on the discharge cycle degradation rate characteristics. The correction ratio calculation unit may calculate, as the temperature correction ratio, the ratio between the average degradation rate in all temperature sections and each temperature section for each discharge current rate based on the discharge cycle degradation rate characteristics.

Acquisition unit 211 of in-vehicle notification device 20 acquires the current discharge current value, SOC, and temperature of power storage unit 41 from vehicle controller 30 via the in-vehicle network. Based on the acquired current discharge current value, SOC, and temperature, with reference to the running life and discharge current rate map, SOC correction ratio, and temperature correction ratio, prediction unit 212 predicts the running life of electric vehicle 3 in accordance with the current driving condition. By considering the SOC usage range and temperature in addition to the current discharge current value, it is possible to predict the running life with higher accuracy.

The examples shown in FIGS. 9 (*a*) and (*b*) and FIG. 11 show a scale indicating the standard of the running life and a bar indicating the running life which expands and contracts in accordance with the current driving condition as a screen interface design for notifying the driver of the predicted running life. The screen interface design for notifying the driver of a predicted running life is not limited to bar display. For example, a scale indicating the standard of running life may be arranged in a circle, and a pointer that rotates clockwise or anticlockwise may be displayed in accordance with the current driving condition. A numerical value indicating the number of years of predicted running life or the predicted running life distance may be digitally displayed. A mark or character in accordance with the predicted running life may be displayed without indicating a numerical value. For example, a negative mark is displayed when the predicted running life falls below the minimum line of running life set by the company, and a positive mark is displayed in the case of exceeding the minimum line. In the case of falling below the minimum line, "bad" may be displayed, and in the case of exceeding the minimum line, "good" may be displayed.

The exemplary embodiment may be specified by the following items.

[Item 1] In-vehicle notification device (20) mounted on electric vehicle (3), in-vehicle notification device (20) including:

acquisition unit (211) that acquires a discharge current value discharged from secondary battery (E1 to En) in electric vehicle (3) to motor for running (34) in electric vehicle (3); and notification unit (23) that notifies a driver of information indicating an impact of a current driving condition by the driver of electric vehicle (3) on degradation of secondary battery (E1 to En) in accordance with a discharge current value acquired by acquisition unit (211).

This makes it possible to suppress degradation of a secondary battery (E1 to En) while ensuring a free driving operation by the driver.

[Item 2] In-vehicle notification device (20) according to item 1 further including:

prediction unit (212) that predicts a running life of electric vehicle (3) based on a map or a function that defines a relationship between a running life of electric vehicle (3) corresponding to a life of the secondary battery (E1 to En) as an in-vehicle battery and a discharge current rate of the secondary battery (E1 to En), and a discharge current value acquired by acquisition unit (211), in which notification unit (23) notifies the driver of information corresponding to a running life of electric vehicle (3) predicted by prediction unit (212).

This makes it possible to highly accurately predict the running life of electric vehicle (3) based on the current discharge current value.

[Item 3] In-vehicle notification device (20) according to item 2, in which acquisition unit (211) further acquires a state of charge (SOC) of the secondary battery (E1 to En), and prediction unit (212) predicts a running life of electric vehicle (3) based on a discharge current value of the secondary battery (E1 to En) and an SOC usage range.

This makes it possible to predict the running life of electric vehicle (3) with higher accuracy based on the current discharge current value and the SOC usage range.

[Item 4] In-vehicle notification device (20) according to item 2, in which acquisition unit (211) further acquires an SOC and a temperature of the secondary battery (E1 to En), and prediction unit (212) predicts a running life of electric vehicle (3) based on a discharge current value of the secondary battery (E1 to En), an SOC usage range, and a temperature.

This makes it possible to predict the running life of electric vehicle (3) with higher accuracy based on the current discharge current value, the SOC usage range, and temperature.

[Item 5] In-vehicle notification device (20) according to any one of items 2 to 4, in which notification unit (23) includes display unit (231), and display unit (231) displays an image in accordance with a running life of electric vehicle (3) predicted by prediction unit (212).

This makes it possible to notify, with an image, the driver of the running life of electric vehicle (3) in accordance with the current driving condition.

[Item 6] In-vehicle notification device (20) according to item 5, in which prediction unit (212) predicts a running life of electric vehicle (3) by running life years or a running life distance, and display unit (231) displays, on a screen, a scale indicating a standard of running life years or a running life distance of electric vehicle (3), and a bar indicating running life years or a running life distance of electric vehicle (3) predicted based on a current discharge current value.

This makes it possible to cause the driver to realize the running life of electric vehicle (3) in accordance with the current driving condition.

[Item 7] In-vehicle notification device (20) according to any one of items 2 to 6, in which notification unit (23) includes voice output unit (232), and voice output unit (232) outputs a voice message in accordance with a running life of electric vehicle (3) predicted by prediction unit (212).

This makes it possible to notify, with a voice, the driver of the running life of electric vehicle (3) in accordance with the current driving condition, and does not require movement of the line of sight of the driver.

[Item 8] In-vehicle notification device (20) according to any one of items 1 to 7 further including recording unit (222) that records a current transition of the secondary battery (E1 to En) based on a driving operation of the driver.

This makes it possible to use the current transition as data for evaluating the driving operation of the driver.

[Item 9] A notification program that causes a computer to execute processing of acquiring a discharge current value discharged from secondary battery (E1 to En) in electric vehicle (3) to motor for running (34) in electric vehicle (3), and processing of notifying a driver of information indicating an impact of a current driving condition by the driver of electric vehicle (3) on degradation of secondary battery (E1 to En) in accordance with an acquired discharge current value.

This makes it possible to suppress degradation of a secondary battery (E1 to En) while ensuring a free driving operation by the driver.

[Item 10] Calculation device (20)

calculating a plurality of average daily discharge current rates from a plurality of running data of electric vehicle (3), and calculating a map or a function that defines a relationship between a running life of electric vehicle (3) corresponding to a life of secondary battery (E1 to En) as an in-vehicle battery and an average daily discharge current rate of secondary battery (E1 to En) based on the plurality of average daily discharge current rates and a degradation rate characteristic of secondary battery (E1 to En) to be mounted on electric vehicle (3).

This makes it possible to highly accurately predict the running life of electric vehicle (3) based on the discharge current value at the time of running of electric vehicle (3).

REFERENCE MARKS IN THE DRAWINGS

3: electric vehicle
4: charger
5: commercial power system
10: calculation device
11: processing unit
111: running data acquisition unit
112: average discharge current rate calculation unit
113: running simulation unit
114: running life and discharge current rate map generation unit
12: recording unit
121: storage degradation rate characteristic map
122: charge cycle degradation rate characteristic map
123: discharge cycle degradation rate characteristic map
20: in-vehicle notification device
21: processing unit
211: acquisition unit
212: prediction unit
213: writing unit
214: external communication unit
22: recording unit
221: running life and discharge current rate map
222: running data recording unit
23: notification unit
231: display unit
232: voice output unit
30: vehicle controller
31f: front wheel
31r: rear wheel
32f: front wheel axle
32r: rear wheel axle
33: transmission
34: motor
35: inverter
36: wireless communication unit
36a: antenna
37: sensor unit
371: vehicle speed sensor
372: GPS sensor
373: gyro sensor
38: charging cable
40: power supply system
41: power storage unit
42: management unit
43: voltage measurement unit
44: temperature measurement unit
45: current measurement unit
46: power storage controller
E1-En: cell
RY1, RY2: relay
T1, T2: temperature sensor
Rs: shunt resistor

What is claimed is:

1. An in-vehicle notification system comprising:
an in-vehicle notification device mounted on an electric vehicle; and
a calculation device configured to generate a running life/discharge current rate map or function used in the in-vehicle notification device, wherein:
the calculation device includes:
a first recording unit comprising:
a storage degradation rate characteristic map;
a charge cycle degradation rate characteristic map; and
a discharge cycle degradation rate characteristic map,
a processing unit programmed to function as:
a running data acquisition unit for acquiring multiple pieces of daily running pattern data of the electric vehicle; and an average discharge current rate calculation unit that calculates, for each of the multiple running pattern data, the average discharge current rate for one day; and a running life and discharge current rate map generation unit configured to generate a running life/discharge current rate map that plots the combination of the average discharge current rate and a number of years of running life corresponding to each of the multiple running pattern data for one day, and generate a running life/discharge current rate map by curve regression of the multiple running pattern data, the in-vehicle notification device includes:

an acquisition unit that acquires a discharge current value, the discharge current value being a value of a discharge current discharged from a secondary battery in the electric vehicle to a motor for running in the electric vehicle; and a notification unit that notifies a driver of the electric vehicle of information indicating an impact of a current driving condition by the driver on degradation of the secondary battery in accordance with the discharge current value acquired by the acquisition unit, the calculation device is configured to, based on the storage degradation rate characteristic map, the charge cycle degradation rate characteristic map and the discharge cycle degradation rate characteristics of the secondary battery and the multiple pieces of daily running pattern data, predict a running life of the electric vehicle for each running pattern data and a running simulation section, and the in-vehicle notification device is configured to identify the running life corresponding to the acquired discharge current value and to notify the driver of information corresponding to the predicted running life of the electric vehicle based on the running life/discharge current rate map provided from the calculation device.

2. The in-vehicle notification system according to claim 1, wherein the in-vehicle notification device further includes:

a prediction unit that predicts the running life of the electric vehicle based on a map or a function and the discharge current value, the map or the function defining a relationship between a running life of the electric vehicle corresponding to a life of the secondary battery as an in-vehicle battery and a discharge current rate of the secondary battery, wherein the notification unit notifies the driver of information corresponding to the running life predicted by the prediction unit.

3. The in-vehicle notification system according to claim 2, wherein the acquisition unit further acquires a state of charge (SOC) of the secondary battery, and the prediction unit predicts the running life of the electric vehicle based on the discharge current value of the secondary battery and the SOC usage range.

4. The in-vehicle notification system according to claim 2, wherein the acquisition unit further acquires a state of charge (SOC) and a temperature of the secondary battery, and the prediction unit predicts the running life of the electric vehicle based on the discharge current value, the SOC usage range, and the temperature of the secondary battery.

5. The in-vehicle notification system device according to claim 2, wherein the notification unit includes a display unit, and the display unit displays an image in accordance with the running life of the electric vehicle predicted by the prediction unit.

6. The in-vehicle notification system according to claim 5, wherein:

the prediction unit predicts the running life of the electric vehicle in running life years or a running life distance, and the display unit displays, on a screen, a scale indicating a standard of the running life years or the running life distance of the electric vehicle, and a bar indicating the running life years or the running life distance of the electric vehicle predicted based on a current discharge current value.

7. The in-vehicle notification system according to claim 2, wherein:

the notification unit includes a voice output unit, and the voice output unit outputs a voice message in accordance with the running life of the electric vehicle predicted by the prediction unit.

8. The in-vehicle notification system according to claim 1, wherein the in-vehicle notification device further includes a second recording unit that records a current transition of the secondary battery based on a driving operation of the driver.

* * * * *